(12) United States Patent
Shizuo et al.

(10) Patent No.: US 8,251,671 B2
(45) Date of Patent: Aug. 28, 2012

(54) APPARATUS FOR CONTROLLING AN AIR DISTRIBUTION SYSTEM

(75) Inventors: Otaki Shizuo, Kuala Lumpur (MY); Kok Keong Thoo, Selangor (MY); Chee Pang Teng, Selangor (MY)

(73) Assignee: OYL Research and Development Centre Sdn. Bhd., Sg. Buloh, Selangor (MY)

( * ) Notice: Subject to any disclaimer, the term of this patent is extended or adjusted under 35 U.S.C. 154(b) by 1246 days.

(21) Appl. No.: 11/937,781

(22) Filed: Nov. 9, 2007

(65) Prior Publication Data

US 2008/0119126 A1    May 22, 2008

(30) Foreign Application Priority Data

Nov. 10, 2006 (MY) .............................. PI 20064486

(51) Int. Cl.
*F04B 49/06* (2006.01)
*H02K 29/08* (2006.01)

(52) U.S. Cl. .................. 417/43; 417/44.11; 318/400.38

(58) Field of Classification Search .................... 417/12, 417/42, 43, 44.11
See application file for complete search history.

(56) References Cited

U.S. PATENT DOCUMENTS

| | | | | |
|---|---|---|---|---|
| 4,781,525 A * | 11/1988 | Hubbard et al. | ............... | 415/30 |
| 2004/0062658 A1* | 4/2004 | Beck et al. | ................... | 417/42 |
| 2006/0034699 A1* | 2/2006 | Flanigan | ........................ | 417/42 |
| 2006/0099084 A1* | 5/2006 | Otaki et al. | .................... | 417/42 |

* cited by examiner

*Primary Examiner* — Charles Freay
(74) *Attorney, Agent, or Firm* — Fish & Richardson P.C.

(57) ABSTRACT

An apparatus for controlling an air distribution system for maintaining a rate of air flow in the system at substantially the target air flow rate, wherein the apparatus detects current speed and torque of said motor and generates said current speed signal and torque signal after detection; receives the current speed signal and torque signal and calculates the current air flow rate in the air distribution system wherein the calculated current air flow rate is compared to the target speed signal of the air flow rate and the current air flow rate is adjusted according to the target speed signal of the air flow by generating a control signal; and controls the motor speed in response to the control signal for maintaining the rate of air flow in the system at substantially the target speed signal of the airflow rate.

6 Claims, 4 Drawing Sheets

Table A

| measure | | | | calculation | |
|---|---|---|---|---|---|
| revolution | Static Pressure | Air flow | Torque signal | Air flow | error |
| r/m | Pa | CFM | | CFM | % |
| 1000 | 127.5 | 1755 | 127.4 | 1759 | -0.19 |
| 1000 | 147.1 | 1667 | 119.1 | 1653 | 0.86 |
| 900 | 73.5 | 1709 | 107.7 | 1697 | 0.74 |
| 900 | 147.1 | 1339 | 82.6 | 1317 | 1.64 |
| 800 | 24.9 | 1667 | 92.4 | 1659 | 0.50 |
| 800 | 98.1 | 1300 | 70.3 | 1280 | 1.58 |
| 720 | 14.7 | 1526 | 75.3 | 1514 | 0.80 |
| 720 | 83.4 | 1141 | 55.6 | 1128 | 1.09 |
| 610 | 19.6 | 1233 | 51.6 | 1228 | 0.38 |
| 610 | 58.8 | 961 | 40.6 | 968 | -0.72 |
| 500 | 19.6 | 943 | 33.2 | 952 | -0.91 |
| 500 | 39.2 | 795 | 27.9 | 798 | -0.46 |
| 400 | 19.6 | 692 | 20.0 | 692 | -0.02 |
| 400 | 39.2 | 392 | 12.4 | 393 | -0.14 |
| 350 | 19.6 | 555 | 14.5 | 545 | 1.71 |
| 350 | 29.4 | 367 | 10.4 | 369 | -0.58 |

Table B

| Constants | |
|---|---|
| A= | 815.785 |
| B= | 11.36759 |
| C= | 30033.42 |
| D= | 0.004343 |
| E= | -0.0077 |
| F= | -56.0355 |
| G= | -190684 |
| H= | 7063.981 |
| I= | -4386800 |

Figure 3

APPARATUS FOR CONTROLLING AN AIR DISTRIBUTION SYSTEM

FIELD OF THE INVENTION

The present invention relates to systems for conditioning air and specifically to control a system for maintaining a desired flow rate of conditioned air through at least part of the system regardless of the static pressure therein.

BACKGROUND ART

Various different techniques have been used in an attempt to flow air through a contained space of a system including air distribution systems for conditioning the temperature of the air and the rate of such air flow being in related to the static pressure in the system. The rate of airflow through the air distribution systems also affected by the speed and torque of a motor used in the system.

One approach involves the laborious task of matching the motor speed and torque with the proper fan to approximate the desired air flow rate for a particular contained space and static pressure of a particular air distribution system. However, this does not accommodate variations in the static pressure in the air distribution system caused by alterations in the system such as the opening, closing or adjusting of a damper connecting a conditioned space in air flow relation with the system. In addition, other devices, such as filter and heat exchangers, may alter the static pressure within the duct system.

If the fan or blower utilised in such systems is of the fan or blade type, an increase in the static pressure acting on such fan will result in a decrease in the air flow rate.

Another approach has been to compensate for the alteration in the speed of fans and the electric motors by employing an apparatus for controlling the motor speed, which requires the calculation of constants specific for each apparatus and air distribution system combination. This apparatus includes a controller, which drives the motor at various speeds but cannot be used with a general motor controller.

It is an object of the present invention to provide an improved system for conditioning air and for maintaining a preselected air flow rate of the conditioned air through at least part of the system regardless of the static pressure therein.

SUMMARY OF THE INVENTION

An apparatus for controlling an air distribution system for maintaining a rate of air flow in the system at substantially the target air flow rate, wherein the apparatus comprises:
  means for detecting current speed and torque of said motor and generating said current speed signal and torque signal after detection;
  means for receiving current speed signal and torque signal and calculating current air flow rate in the air distribution system wherein the calculated current air flow rate is being compared to the target speed signal of the air flow rate and the current air flow rate is adjusted according to the target speed signal of the air flow by generating a control signal; and
  means for controlling the motor speed in response to the control signal for maintaining the rate of air flow in the system at substantially the target speed signal of the airflow rate.

An apparatus for controlling an air distribution system for maintaining a rate of air flow in the system at substantially the target air flow rate, wherein the microprocessor operates accordance with the following algorithm:

$$Qa = A + B*Ta + C/Ta + (D + E*Ta + F/Ta)*Na + (G + H*Qa + I/Qa)/Na,$$

wherein Qa is the actual air flow rate signal, Ta is the present value of the motor speed signal, Na is the present value of the torque signal, and A to I are constants representing characteristics of the blower, motor and variable speed motor controller.

BRIEF DESCRIPTION OF THE DRAWINGS

FIGS. 3 (a) and 3(b) illustrate a comparison airflow rate between actual airflow rate and calculated airflow rate.

DETAILED DESCRIPTION OF THE PREFERRED EMBODIMENTS

Figure 1:
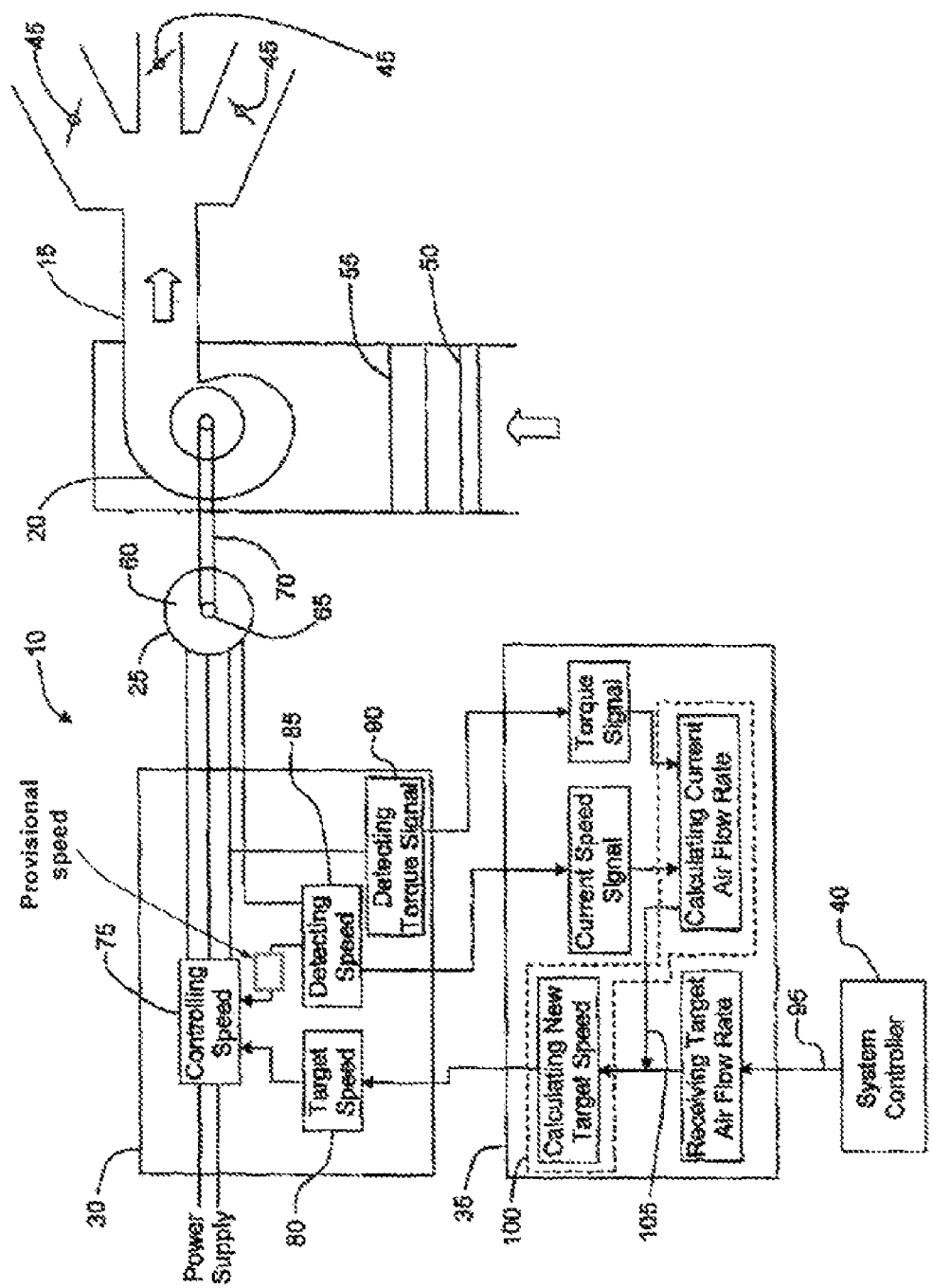
FIG. 1 illustrates a block diagram of an apparatus for controlling air distribution system in one embodiment of the present invention.

FIG. 1 is a block diagram illustrative of an apparatus for controlling air distribution system 10 of one embodiment of the present invention. The apparatus for controlling air distribution system 10 comprises a duct system 15, a blower 20, a motor 25, a variable speed motor controller 30, an air flow control module 35, and a system control 40. The duct system 15 is a conduit used for distributing air to the desired zone. For instance, the duct system 15 may be installed in a building for providing conditioned air to desired rooms therein. As mentioned earlier, static pressures formed within the duct system 15 are affected by dampers 45, filter 50, and heat exchangers 55 which are incorporated in the duct system 15.

The blower 20 is a device, such as a fan, for causing air to flow in the duct system 15 and is typically installed therein. In one preferred embodiment, the blower 20 comprises a forward curved centrifugal fan. However, the blower 20 may be any type of blade, fan, or other device for moving air in an air distribution system.

The motor 25 is a device for providing the necessary mechanical power for driving the blower 20. In one preferred embodiment, the motor 25 includes a stationary assembly 60 with a plurality of winding stages for carrying motor current and further includes a rotational assembly 65 in driving relationship with the blower 20. The motor 25 may be any device capable of driving the blower 20 such as a brushless DC motor. The motor 25 is drivingly connected to the blower 20 by pulley system 70. Alternatively, the motor 25 and the blower 20 may be an integrated device such that the motor 25 is inserted into the blower 20, attached with a set screw and electrically connected therein (not shown).

The variable speed motor controller 30 is a means for controlling the motor speed in response to a target speed signal 80 generated by the air flow control module 35, a means for providing a speed signal 85 representative of the speed of the motor 25 and a means for providing a torque signal 90 relatively representative of the torque of the motor. The speed signal 85 may be provided by a device to count pulse sent from the brushless DC motor. The torque signal 90 may be provided by either a device to represent a voltage to be supplied to the motor 25 or a device to represent a current to be supplied to the motor 25. The variable speed motor controller 30 is a type of armature-voltage control, is responsive to a target speed signal 80 and control a speed of the motor 25 by comparison between a target speed signal 80 and a speed signal 85.

The variable speed motor controller 30 is electrically connected to the airflow control module 35 for receiving the target speed signal 80 and for sending the speed signal 85 and the torque signal 90. The variable speed motor controller 30 is also electrically connected to the motor 25 for applying a voltage to one or more of the winding stages at a time and for commutating the winding stages in a pre-selected sequence to rotate the rotational assembly 65. Accordingly, the variable speed motor controller 30 controls the speed of the motor 25 in response to the target speed signal 80 provided by the air flow control module 35.

The air flow control module 35 is a means for providing a target speed signal 80 in response to a target air flow rate signal 95, a speed signal 85 and a torque signal 90 as will be explained hereinbelow. The target air flow rate signal 95 is generated by the system control 40. The speed signal 85 and the torque signal 90 are generated by the variable speed motor controller 30. The air flow control module 35 comprises a microprocessor 100 for calculating an air flow rate signal 105 by the speed signal 85 and the torque signal 90 and for calculating the target speed signal 80 by the target air flow rate signal 95, a speed signal 85 and the air flow rate signal 105.

The system control 40 is a device or system which supplies the air flow control 35 with a target flow rate signal 95 representative of desired air flow rate. The system control 40 may be responsive to sensors and user input (not shown).

In one preferred embodiment according to the invention, the air flow control module 35 operates in accordance with a constant airflow algorithm for controlling and compensating the motor speed. This algorithm allows the motor 25 to provide a constant airflow within the air distribution system 10 regardless of variations in static pressure. Controlling the motor 25 in this manner provides enhanced independence of the airflow rate to the static pressure within the air distribution system 10. The constant airflow algorithm demonstrates the cooperation of the present invention and is described hereinbelow.

Figure 2:
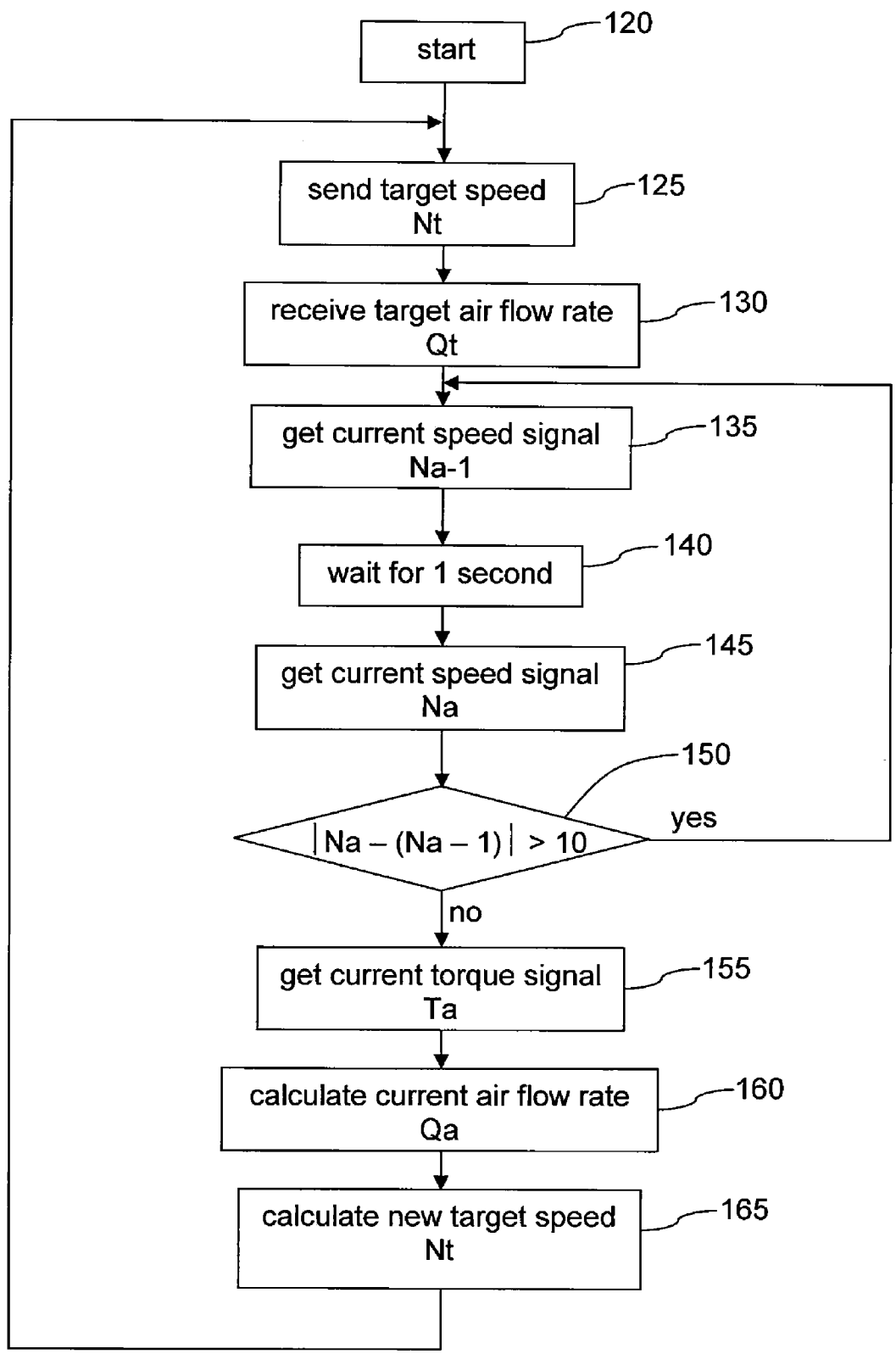
FIG. 2 illustrates a flow diagram of the algorithm of one embodiment of the present invention.

FIG. 2 is a flow diagram of the constant airflow algorithm embodied in the present invention. Beginning at block 120 labelled "start" the first step performed 125 is to send an initial target speed signal which can be selected at any speed signal or may be a final target speed signal at the last operation. In step 130, the air flow control module 35 receives the target airflow rate signal 95 ("Qt") transmitted from the system control 140. In step 135, the air flow control module 35 receives the speed signal 85 ("Na-1") transmitted from the variable speed motor controller 30. In next step 140, the air flow control module 35 waits for 1 second and after 1 second in step 145, the microprocessor 100 receives the speed signal 85 ("Na") transmitted from the variable speed motor controller 30. In step 150 the microprocessor 100 compares "Na-1" with "Na". If difference between "Na-1" and "Na" is more than 10 rpm, the microprocessor 100 returns to step 135 to wait for stability of the motor speed. If difference between "Na-1" and "Na" is equal or less than 10 rpm, the microprocessor 100 moves to step 155 to receive the torque signal 90 ("Ta") transmitted from the variable speed motor controller 30. In step 160, the microprocessor 100 calculates an air flow rate signal ("Qa") by the torque signal 90 ("Ta") and the speed signal 85 ("Na") using the following algorithm $$Qa = A + B*Ta + C/Ta + (D + E*Ta + F/Ta)*Na + (G + H*Qa + I/Qa)/Na,$$

wherein Qa is the actual air flow rate signal, Ta is the present value of the motor speed signal 85, Na is the present value of the torque signal 90, and A to I are constants representing characteristics of the blower 20, the motor 25 and the variable speed motor controller 30. In step 165, the microprocessor 100 calculates a target speed signal 80 ("Nt") by the target air flow rate signal 95 ("Qt"), the actual air flow rate signal ("Qa") and the speed signal 85 ("Na") using the following algorithm: Nt=Qt/Qa*Na, wherein Nt is a new target speed signal, Qa is the actual air flow rate signal calculated in step 160, Qt is the present value of the target air flow rate signal 95 and Na is the present value of the speed signal 90. After step 165, the microprocessor 100 returns to step 125 to send the new target speed signal ("Nt") to the variable speed motor controller 30 and start the cycle again.

FIG. 3 is a comparison of airflow rate between actual airflow rate and calculated airflow rate by one preferred embodiment of the present invention. The left 4 columns of table A represent test data and the right 2 columns represent calculated results by equation mentioned in step 160 and the constants which are shown in table B on FIG. 3. The first column represents the experimental value of the motor speed. The second column represents the experimental value of the static pressure. The third column represents the experimental value of the airflow rate. The forth column represents the experimental value of the torque signal 90. The fifth column represents the calculated value of the air flow given a particular blower geometry, motor 25, and variable speed motor controller 30. The sixth column represents the percent error of the calculated values of the airflow and the experimental values of the airflow. As this chart illustrates, the value of the percent error between the calculated values of the air flow and the experimental values of the air flow are less than 2% and the calculated values of the air flow in one preferred embodiment of the present invention expresses the experimental values of the air flow accurately.

Figure 4:
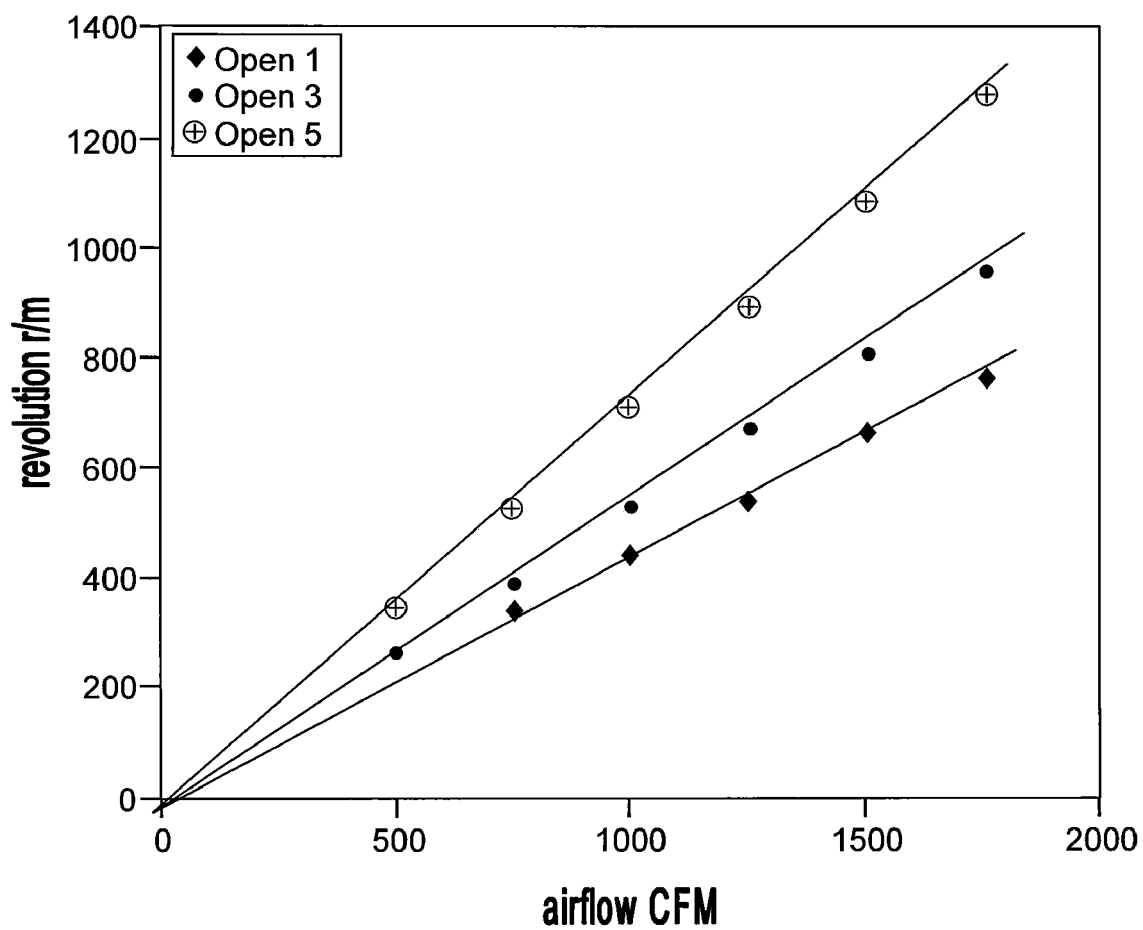
FIG. 4 illustrates a performance graph showing revolution versus airflow rate at different external static pressure.

FIG. 4 is a performance chart of one preferred embodiment of the present invention. On this chart, a horizontal level is an air flow rate with unit CFM, a vertical level is a motor speed and plotted points represent the experimental result in each case that damper 45 open in due order. As this chart illustrates, data of same opening ratio of damper 45 approximate straight line, these straight lines converge to the origin and therefore the calculating algorithm of the new target speed in one preferred embodiment of the present invention is effective.

Thus, the present invention provides an improved system and method for conditioning air and for maintaining a pre-selected air flow rate of the conditioned air through at least part of the system regardless of the static pressure therein for use in conjunction with numerous duct systems without the need for calibration particular to the specific duct system.

Although the motor 25 and the variable speed motor controller 30 has been described as a DC brushless motor and a type of an armature-voltage control, one skilled in the art will readily recognise that a combination of an induction motor and a type of a primary voltage control or combination of an induction motor and a type of a primary frequency control may also control the speed of the motor 25.

Although the invention has been shown and described with respect to a best mode embodiment thereof, it should be understood by those skilled in the art that various other change, omissions and additions in the form and detail thereof may be made therein without departing from the spirit and scope of the invention.

The invention claimed is:

1. An apparatus for controlling an air distribution system of the type which includes a duct system, a motor drivingly associated with a blower and a target air flow rate signal which represents a target air flow for the air distribution system, the apparatus providing control of the motor speed to maintain a rate of air flow in the system at substantially the target air flow rate, wherein the apparatus comprises:

- a variable speed motor controller means for controlling the motor speed to a provisional speed or a target speed;
- a speed detecting device for providing a speed signal relatively representative of the speed of motor;
- a torque detecting device for providing a torque signal relatively representative of the torque of motor; and
- a module responsive to inputs from the variable speed controller means to calculate a current air flow rate from a current speed and torque signal from the speed detecting device and torque detecting device, the module using the current air flow rate, the target air flow rate and the current speed to calculate a target air flow speed, the variable speed motor controller means using the target air flow speed to produce a control signal which is supplied to control application of voltage to the motor, the voltage supplied to the motor being sufficient for the motor to produce the target air flow rate;

wherein the current air flow rate is calculated in accordance with the following algorithm:

$$Qa=A+B*Ta+C/Ta+(D+E*Ta+F/Ta)*Na+(G+H*Qa+I/Qa)/Na;$$

wherein the target speed is calculated in accordance with the following algorithm:

$$Nt=Qt/Qa*Na;$$

wherein Qa equals to a current air flow rate, Ta equals to a present value of the torque signal, Na equals to a present value of the motor speed signal, A to I equal to constants, Nt equals to the target speed, and Qt equals to the target air flow rate.

2. An apparatus as claimed in claim 1 wherein the provisional speed represents a speed of current operation.

3. An apparatus as claimed in claim 1 wherein the provisional speed represents a speed at which the motor operated last time, wherein the last time is the previous time before the variable speed motor controller means stops to operate and when the variable speed motor controller means restarts the motor and sets to run at the previous speed.

4. An apparatus as claimed in claim 1 wherein the torque signal represents a current of input of motor.

5. An apparatus as claimed in claim 1 wherein the torque signal represents a voltage of input of motor.

6. An apparatus as claimed in claim 1 wherein the torque signal represents a slip that is the difference between an electrical supplied frequency and the motor speed, wherein the electrical supplied frequency is the speed of the motor detected by the speed detecting device.

* * * * *